(12) United States Patent
Mercuriali et al.

(10) Patent No.: US 7,512,119 B2
(45) Date of Patent: Mar. 31, 2009

(54) METHOD FOR ESTABLISHING COMMUNICATION PATHS BETWEEN ACCESS POINTS OF A COMMUNICATION SYSTEM AND A COMMUNICATION SYSTEM USING SAID METHOD

(75) Inventors: Jean-Pierre Mercuriali, Orsay (FR); Emmanuel Chevrier, Limours (FR)

(73) Assignee: Aastra Matra Telecom, Montigny-Le-Bretonneux (FR)

( * ) Notice: Subject to any disclaimer, the term of this patent is extended or adjusted under 35 U.S.C. 154(b) by 777 days.

(21) Appl. No.: 10/471,440

(22) PCT Filed: Mar. 20, 2002

(86) PCT No.: PCT/FR02/00971

§ 371 (c)(1),
(2), (4) Date: Sep. 10, 2003

(87) PCT Pub. No.: WO02/078277

PCT Pub. Date: Oct. 3, 2002

(65) Prior Publication Data

US 2004/0114613 A1 Jun. 17, 2004

(30) Foreign Application Priority Data

Mar. 23, 2001 (FR) .................................. 01 03944

(51) Int. Cl.
*H04L 12/66* (2006.01)
(52) U.S. Cl. ...................... 370/353; 370/395.2; 370/401
(58) Field of Classification Search ......... 370/352–356; 379/900
See application file for complete search history.

(56) References Cited

U.S. PATENT DOCUMENTS

| | | | | |
|---|---|---|---|---|
| 5,867,494 A * | 2/1999 | Krishnaswamy et al. | ..... | 370/352 |
| 6,084,956 A * | 7/2000 | Turner et al. | ................. | 379/230 |
| 6,094,479 A * | 7/2000 | Lindeberg et al. | ....... | 379/220.01 |
| 6,201,804 B1 * | 3/2001 | Kikinis | ........................ | 370/352 |
| 6,385,179 B1 * | 5/2002 | Malcolm et al. | ............ | 370/329 |
| 6,728,236 B2 * | 4/2004 | Potter et al. | .................. | 370/352 |
| 6,876,633 B2 * | 4/2005 | Strathmeyer et al. | ........ | 370/260 |
| 7,072,308 B2 * | 7/2006 | Strathmeyer et al. | ........ | 370/259 |
| 7,123,712 B1 * | 10/2006 | Strathmeyer et al. | ... | 379/265.09 |
| 7,177,411 B1 * | 2/2007 | Collette | ................. | 379/201.12 |
| 7,194,558 B2 * | 3/2007 | Kawamoto et al. | .......... | 709/249 |
| 2001/0012357 A1 * | 8/2001 | Mirashrafi et al. | ..... | 379/387.01 |
| 2002/0122547 A1 * | 9/2002 | Hinchey et al. | ........ | 379/221.01 |

FOREIGN PATENT DOCUMENTS

WO       WO 95/31060       11/1995

OTHER PUBLICATIONS

Huitema C et al., "An Architecture for Residential Internet Telephony Service", IEEE Network, IEEE Inc. New York, US, vol. 13, No. 3, May 1999, pp. 50-56.
Preliminary International Search Report dated Dec. 21, 2001 Appl. No. FR 0103944.

* cited by examiner

*Primary Examiner*—Hassan Kizou
*Assistant Examiner*—Bo Hui A Zhu
(74) *Attorney, Agent, or Firm*—McCracken & Frank LLP

(57) ABSTRACT

System access points are located either in a packet transmission network or at switching unit interfaces provided with gateways with the packet network. Call servers store context data concerning terminals connected to the system through the access points and cooperate with a configuration manager in order to establish communication paths between different access points.

12 Claims, 4 Drawing Sheets

METHOD FOR ESTABLISHING COMMUNICATION PATHS BETWEEN ACCESS POINTS OF A COMMUNICATION SYSTEM AND A COMMUNICATION SYSTEM USING SAID METHOD

BACKGROUND OF THE INVENTION

The present invention relates to the field of communication networks, and more specifically to voice transport networks having one or more circuit-switching sub-networks and one or more packet transmission sub-networks, with gateway interfaces to interconnect them.

The development of the Internet network has greatly contributed to the appearance then expansion of telecommunication services designed to operate in accordance with the protocol suite of this network, in particular the IP (Internet Protocol, Request for Comments (RFC) 760, Internet Engineering Task Force (IETF), January 1980) network layer protocol.

Telephony services, developed first around circuit-switching techniques, then more recently proposed on IP networks, are one example of this transformation. High-performance integrated networks are being designed today, offering voice and data transport services and operating entirely using the IP protocol.

However, the underlying economic and technical requirements impose that a seamless transition takes place, meaning that a technology jump cannot reasonably be considered. It is appropriate to contemplate an intermediate step during which heterogeneous networks, arising from the interconnection of traditional PABX (Private Automatic Branch eXchange) networks with networks operating entirely using the IP protocol, will be developed.

Such heterogeneous networks may for example include one or more Local Area Networks (LANs) operating using the IP protocol, interconnected with one or more traditional PABX networks forming a "multi-site" network.

A PABX network generally incorporates a set of telephony applications including a communication path supervision application. For each communication admitted by the topology of the network, such an application determines, according to the network's topological description data to which it has access and according to input parameters specific to the communication, a communication path which may then be reserved and then used.

The determination of such a path, more specifically the choice of topological nodes that come one after the other along the path, takes place preferably independently of the technology used to form each of the routes linking these nodes. In the OSI reference model, the process does not fall beneath the network layer. For example, the communication path supervision application is not concerned as to whether the path between two nodes makes use of a 64 kbit/s PCM link or an IP-based LAN. Next a link-layer process takes charge of implementing the switching path, that is reserving appropriate resources along the determined path and managing the use of these resources.

During configuration of the PABX network, network management software is used to declare the routes capable of transporting the determined type of traffic. The parameters of this declaration include in particular the route type, the corresponding topological nodes, the voice traffic transport parameters (in particular the coding laws), etc. The PABX network topology is therefore known by at least some of the network applications, in particular the communication path supervision and setup applications.

This intelligence is absent from networks operating using the IP protocol since, in such a network, the routing of datagrams, whether or not they transport voice, is performed by mechanisms internal to the network which do not interact with the client applications to determine the path used by each packet. Only the IP address of the recipient is taken into account. The RSVP ("Resource ReSerVation Protocol", RFC 2205, IETF, September 1997) protocol intended to increase the quality of service offered to users of IP networks does not bring about any change since it relies on the IP routing mechanisms, and remains an IP network tool, unlike in the case of PABX networks which specifically incorporate path supervision and setup tools.

The success of IP networks has led to the development of applications for the transport of voice over IP networks, raising the possibility of traditional PABX networks eventually being replaced by multi-service IP networks. Most developers are studying systems operating entirely using the IP protocol. Solutions intended for heterogeneous networks, made up partly of one or more IP protocol transmission networks and partly of one or more PABX networks, are not being studied much.

An object of the present invention is to improve interaction between the various types of networks forming a heterogeneous communication system, in order to optimize use of all the resources of the network.

SUMMARY OF THE INVENTION

The present invention thus proposes a method for establishing communication paths between access points of a communication system, the communication system including at least one packet transmission network providing a first family of access points, switching means equipped with connection interfaces providing a second family of access points and at least one gateway interface with the packet transmission network, call processing means including at least one call server to store configuration data and context data relating to terminals connected to the system via the access points and to perform processing of signaling relating to said terminals, and at least one call configuration manager cooperating with the call processing means to select a communication path establishment mode from a first mode governed by mechanisms of the packet transmission network and a second mode governed by mechanisms of the switching means. The mechanisms of the switching means governing the second mode exploit predefined data describing a topology of the communication system made up of topological nodes belonging to the switching means and admitted topological paths within the switching means between pairs of topological nodes. There is associated with each access point a respective reference topological node belonging to the switching means, such that the reference topological node of each access point of the second family is accessible from said access point without passing via the packet transmission network. The establishment of a communication path between access points to place in communication the first and second terminals respectively connected to said access points includes the steps of:

creating a first call processing task in a call server associated with the first terminal;

forming, at the first call processing task, an establishment message including at least a number of the first terminal, an indication of the family of the access point to which the first terminal is connected and the reference topological node of said access point;

in response to reception of said establishment message, creating a second call processing task in a call server associated with the second terminal; and querying the configuration server from the second call processing task, on the basis of the families and the reference topological nodes of the access points to which the first and second terminals are respectively connected, to obtain call configuration data indicating the establishment mode selected for the communication path between said access points.

Thus, knowledge by the system administrator of the topology of a PABX network can be usefully exploited on the scale of the heterogeneous system according to the invention. The administrator has a great deal of flexibility for developing his existing installation, generally consisting of conventional PABXs, by adding to it sub-networks operating using the IP protocol. He can configure his system so that it uses the path establishment and supervision mechanisms of the PABX world or those specific to the IP world. He can thus consider the gradual migration of his installation toward an IP architecture.

In particular, the mechanisms of the first mode (PABX) can be favored selectively in certain call configurations by admitting into the topology at least one topological path between two topological nodes having a portion belonging to the packet transmission network, while at least one other topological path between two topological nodes having a portion belonging to the packet transmission network is not admitted in order to favor the mechanisms of the first IP mode between the terminals connected to the access points associated with these latter nodes.

Another aspect of the present invention relates to a communication system including a packet transmission network providing a first family of access points, switching means equipped with connection interfaces providing a second family of access points and with at least one gateway interface with the packet transmission network, call processing means to store configuration data and context data relating to terminals connected to the system via the access points and to perform processing of signaling relating to said terminals, and at least one call configuration manager cooperating with the call processing means in accordance with a method as defined above to select a communication path establishment mode from a first mode governed by mechanisms of the packet transmission network and a second mode governed by mechanisms of the switching means.

DESCRIPTION OF PREFERRED EMBODIMENTS

Figure 1:
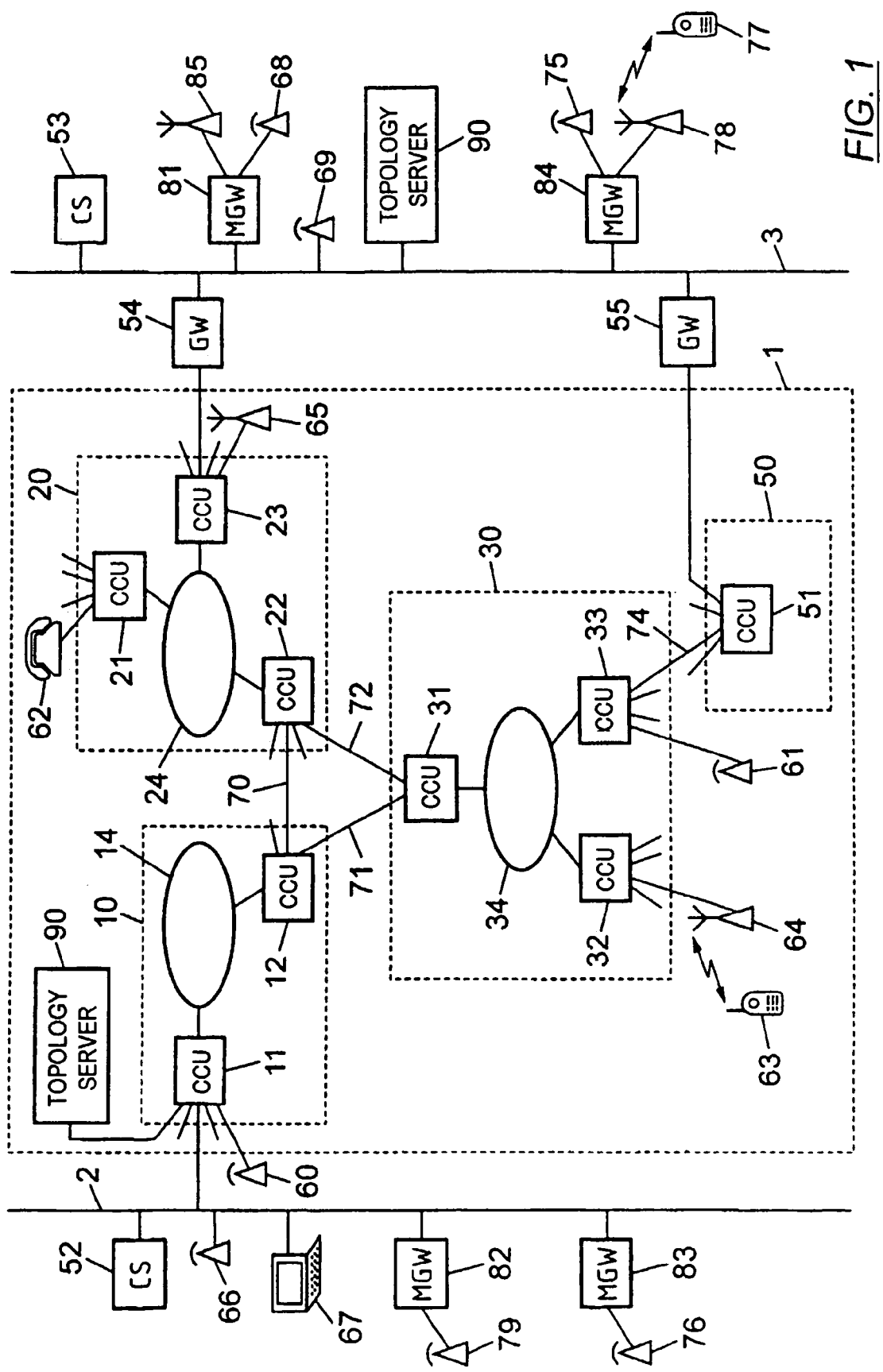
FIG. 1 is a block diagram of a communication system according to the invention.

FIG. 1 shows, by way of illustration, an example of a communication system comprising a circuit-switching network 1 made up of four PABXs 10, 20, 30, 50. Each PABX has a cluster-based structure. It thus includes one or more cluster control units (CCUs) 11-12, 21-23, 31-33, 51 each including a set of access points to the system. The access points can serve as interfaces with various types of lines, according to the desired compatibilities of the system. In particular, access points can be provided for connecting conventional telephony terminals 60-62, which may be analog (simple S63 terminals or "intelligent" terminals) or digital (X.25 terminals, ISDN, etc. terminals). To enable communications with mobile terminals 63 (for example CT2 or DECT) if necessary, some of the CCUs can include wireless access points connected to respective base stations 64, 65.

Each CCU has sufficient resources to support communications between its own access points, in particular a call server.

Each PABX 10, 20, 30 with several CCUs is equipped with a transport loop 14, 24, 34 enabling inter-CCU exchanges so as to support communications between several access points belonging to this PABX. By way of example, the loop 14, 24, 34 may be a 40 Mbit/s digital line organized on a time-division basis to support 512 circuit-switching channels ("circuit channels") and 70 packet switching channels ("packet channels"). The circuit channels are provided for access point whose operation requires the reservation of a circuit resource, while the packet channels are provided for access points used by packet switching communications and for exchanges of control information specific to the switching system (in particular the signaling functions). Control units, not represented, are provided in the PABXs 10, 20, 30 to supervise operation of the transport loops 14, 24, 34.

If the system has several PABXs, inter-PABX lines 70-72, 74 (for example PCM lines that are private or leased to a public operator) may be provided between some of their CCUs 12, 22, 31, 33, 51.

In the example represented, the PABX network 1 cooperates with two Local Area Networks (LANs) 2, 3 supporting the IP protocol. This forms an overall heterogeneous network: the LANs that transmit packets coexist with the PABXs which, at least with regard to voice traffic, switch circuits.

The PABX 10 is connected to the LAN 2 via an access point of its CCU 11. Such CCUs, called "gateway CCUs", are equipped with one or more gateway interfaces each having a specified address in the IP network. The networks 1 and 3 are interconnected by means of gateway interfaces 54, 55 (GW) linked to the CCUs 23, 51. These gateway interfaces 54, 55 are external to the CCUs 23, 51 but functionally similar to those incorporated in the CCU 11. For example they comply with the H.323 standard of the ITU-T. The operation of H.323 gateways has been detailed over the course of the TIPHON (Telecommunications and Internet Protocol Harmonisation Over Networks) project of the ETSI (European Telecommunications Standards Institute). The H.323 model defines three entities: the gatekeeper, the gateway (GW), and the terminal. The H.323 gateway functions are distributed over three modules: the Signaling Gateway (SG), the Media GateWay (MGW), and the Media Gateway Controller (MGC). The media gateway converts flows from a first type of network to a format corresponding to a second type of network. The signaling processing operations concerning the setup of a communication via the media gateway are performed by the gateway controller MGC.

Various terminals 66, 67, 69, called "IP terminals", are directly connected to the LANs 2, 3 and are managed by two call servers 52, 53 respectively connected to the LANs 2, 3. The call servers 52, 53 may operate according to standardized protocols, for example according to the H.323 standard. An IP terminal is for example a telephone terminal 66, 69 incorporating an IP interface or even a microcomputer 67 running an application for telephony over IP networks, for example an operator-set type application.

In a manner known per se, conventional terminals 68, 75-77, 79 can be connected to the LANs 2, 3 via media gateways (MGWs) 81-84, if necessary controlled by media gateway controllers (MGCs) (not represented in FIG. 1) supporting protocols such as Megaco (see "Megaco Protocol", Internet Draft, IETF, Feb. 21, 2000). These terminals are for example S.63 terminals (68, 75) or ISDN terminals (76, 79) or even wireless terminals (77) that connect via base stations 78, 85 linked to certain MGWs 81, 84. Although not mandatory, it would be convenient if these conventional terminals 68, 75-77, 79 were managed by the call servers 52, 53 linked to the LANs.

An MGW 81-84 is capable of switching circuits between the conventional terminals that are directly connected to it. The logic for defining paths between these conventional terminals is therefore closer to that currently applied in the PABX network than to that of the IP network 2, 3 (best-effort datagram routing). In the configuration of the system, there are two families of access points:

the "conventional" access points offered by the CCUs 11-12, 21-23, 31-33, 51 and by the MGWs 81-84, to which are connected conventional terminals 60-63, 68, 75-77, 79. The communication path supervision and setup mechanisms provided in the PABXs 10, 20, 30, 50 usually apply to these access points;

the "IP" access points provided by the LANs 2, 3, to which are connected IP terminals 66, 67, 69. At these access points, it is the IP-network-specific mechanisms (IP routing, where necessary RSVP, H.323/TCP/IP) that enable communication path establishment.

By way of example, signaling is transmitted over the IP network in accordance with the ITU-T H.323 standard in sessions of the TCP transport protocol established between two call servers or between an IP terminal and its call server.

For the transmission of coded speech over the IP subnetworks 2, 3, the UDP (User Datagram Protocol, RFC 768, IETF, August 1980) transport protocol and the real-time protocols RTP and RTCP are used, as is normally the case. Various speech coding/decoding modes may be used by the IP terminals 66, 67, 69. In the case of H.323, the audio coding may comply with one of the ITU-T Recommendations G.711, G.722, G.723.1, G.728 and G.729.

Each call server of the system manages a set of client terminals. Each client has information identifying the call server which is associated with it, to which it addresses its requests.

An IP terminal 66, 67, 69 directly connected to a LAN 2, 3 knows, a priori, only the IP address of its call server 52, 53, or of a gateway (H.323 gatekeeper) enabling it to reach this server if the latter is located in the PABX network 1.

A conventional terminal connected to the PABX network knows, as far as it is concerned, one CCU ("reference CCU") that is always knows how to link to and that incorporates the associated call server. This reference CCU is advantageously chosen as being the one to which the terminal is directly connected (otherwise, in particular if a mobile terminal 63 is concerned, it can reach it via packet channels of the PABX network).

The call server associated with a conventional terminal 68, 75-77, 79 connected to a LAN 2, 3 via an MGW 81-84 can be (i) located in this MGW (if the latter includes such functionalities), (ii) a server 52, 53 of the LAN or (iii) in a CCU of the multi-site network 1. In case (i), the terminal directly accesses its call server. In cases (ii) and (iii), the MGW takes on the task of relaying the signaling concerning the terminal from and to the call server, if necessary via an MGC and/or a gateway 54, 55.

The concept of a topological node of a network corresponds in general to physical equipment to which is connected at least one physical carrier (physical cable, optical fiber, air interface, etc.) over which a communication flow can be conveyed. A topological link corresponds to a physical carrier over which a communication flow can be conveyed between two end nodes. Two topological nodes are referred to as "neighbors" if they are directly connected by a topological link, without the intermediary of an additional topological node. A topological path between two topological end nodes that are not necessarily neighbors consists of a succession of topological links enabling these nodes to be gradually connected. Two separate topological nodes are referred to as "tied" if there is at least one topological path for which they are the end nodes.

The applications of the PABX network 1 which are responsible for supervising and setting up communication paths make use of a topology defined by the system configuration, made up of topological nodes, links and paths. In a typical implementation, the network 1 topological nodes considered during system configuration are CCUs (they could also be PABXs or interfaces).

The invention makes provision for the capability of declaring as topological nodes equipment which is accessible from the PABX network only via the IP network, even though in theory the administrator of the network 1 has no knowledge of the topology of the LANs 2, 3. This equipment is typically the MGWs 81-83 which provide a circuit type service to the terminals connected to them.

Topological paths of which one end node consists of an MGW 81-84 can thus be admitted in the topology taken into account by the communication path supervision and setup applications of the PABX network.

However, it will generally be preferable not to admit topological paths between two MGWs directly connected to each other by a LAN since the IP mechanisms are well suited to calls that involve them both.

Topological paths between two MGWs may however be admitted, in particular in the specific case (which is not the most frequently occurring) in which the IP network has several "non-tied" sub-networks (LANs). For example, in the case of FIG. 1, it is preferable not to admit a topological path between the MGWs 81 and 84 or between the MGWs 82 and 83, whereas it is more worthwhile to admit a topological path between the MGWs 82 (or 83) and 81 (or 84). The system administrator has a great deal of flexibility in defining these paths.

In accordance with the invention, each access point of the system is associated with a topological node of a PABX network, referred to as "reference topological node".

Each "conventional" access point of the PABX network 1 is advantageously associated with the reference topological node corresponding to its CCU. The CCUs 11, 21, 32 and 33 are the reference topological nodes of the access points to which the terminals 60, 62, 63 and 61 respectively are connected.

Likewise, the other conventional access points provided by the MGWs 81-84 connected to the LANs 2, 3 are associated with the reference topological nodes respectively corresponding to these MGWs 81-84. In other words any media gateway (MGW) device of the system is considered as a topological node of the network 1, and is declared as reference topological node of its access points.

For a direct point of access to a LAN, at which an IP terminal 66, 67, 69 is connected, the reference topological node can be an MGW connected to the same LAN, and advantageously located near the access point. This reference topological node can also be a CCU of the network 1, equipped with a gateway with the same LAN. In particular, if the call server of an IP terminal corresponds to a call server of a gateway CCU 11, it would be convenient if this gateway CCU 11 were the reference topological node of the access point of this terminal.

The correspondence between each access point to which a terminal of the system is connected and its reference topological node is one of the items of data stored for the terminal in its call server, for example using a look-up table. This means that the terminals need not have knowledge of data relating to the reference topological node of their access points.

In the example represented in FIG. 1, the system has two topology servers 90, one linked to an access point of the CCU 11 of the PABX 10, and the other directly connected to the LAN 3. These two servers essentially contain the same data and they execute the same procedures described later, one or the other being queried depending on the call server that queries it. It will be noted that a number of other implementations would be possible, for example providing a single topology server accessible by the whole system, or a topology server for each sub-network 1, 2, 3, or even implementing the topology server in the form of tables simply stored in each call server capable of querying it.

In the particular case in which the IP network 2, 3 is not totally "tied" (as in FIG. 1), the topology server 90 additionally contains a double-entry table referred to as "IP path table" in which are recorded pairs of IP addresses of terminals and gateways between which there exists a communication path entirely supported by the IP part of the system. Advantageously, a community concept is used, defined as a set of IP addresses. This means that the dimensions of the IP path table can be restricted, and this table then contains pairs of communities. In the example of FIG. 1, two communities can thus be defined, each made up of the IP addresses of the LANs 2 and 3.

The setting up of a telephone call between two subscriber terminals is initialized by a call signaling phase during which the path that the speech signals will take is determined.

Figure 2:
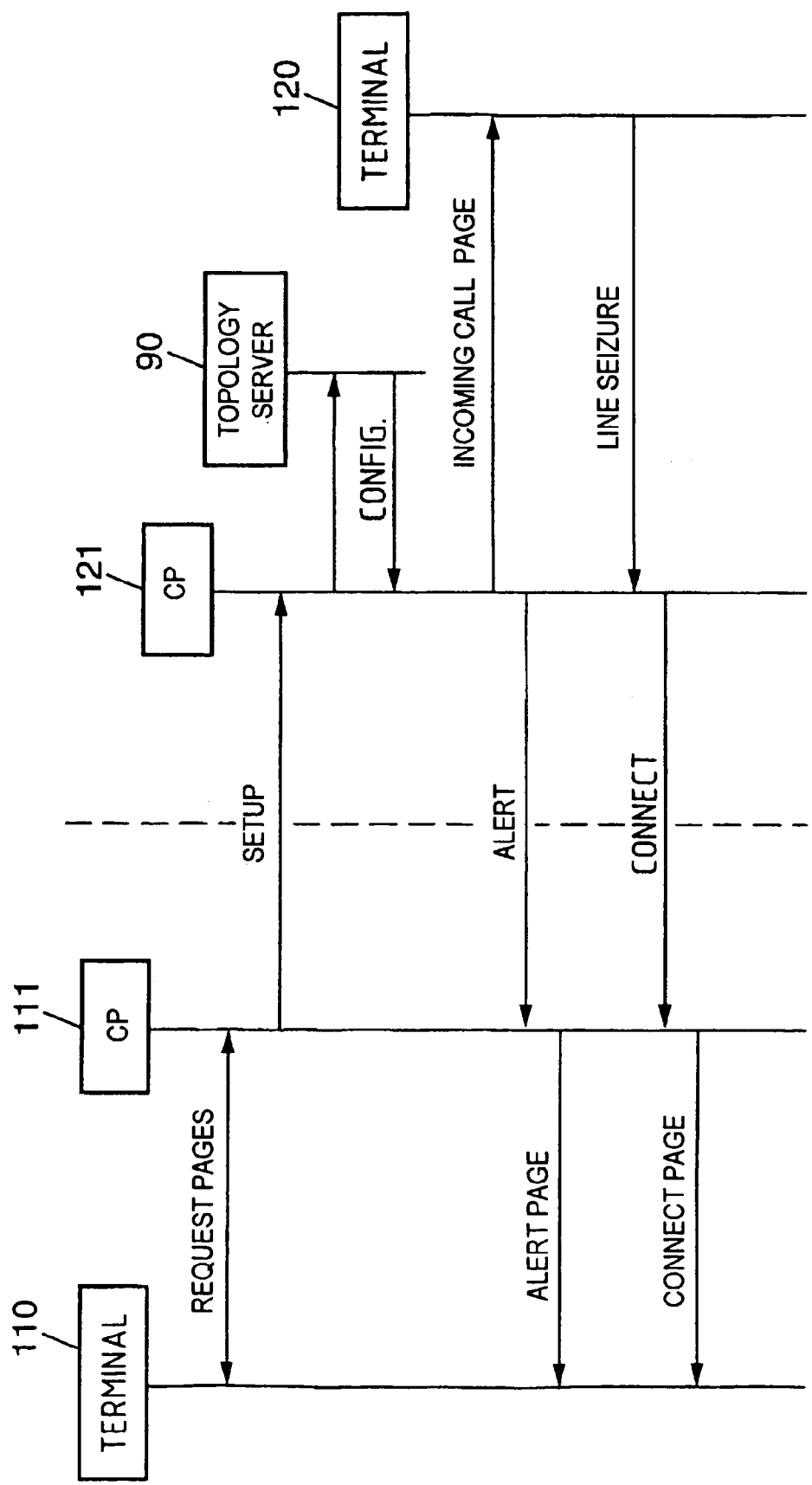
FIG. 2 illustrates the signaling flows during the setting up of a call between two terminals in accordance with the invention.

In the diagram of FIG. 2, the signaling processing operations concerning a terminal (leg) are managed by a call processing (CP) task executed by the terminal's call server. The left part of each diagram corresponds to the calling party leg, and the right part to the called party leg.

The call signaling starts with an exchange of information between the calling terminal 110 and the call processing task ill which corresponds to it. This task 111 has for example been created by the call server of the calling terminal 110 upon reception of a message indicating line seizure by this terminal. It addresses to the terminal the pages coding the information to be presented to the user (displays, tones, etc.), and retrieves the data supplied by the user in order to define its request (choice of functions, dialed number, etc.). When the task 111 has enough information, the call server broadcasts to the system a setup message (SET_UP), including in particular the following elements:

the directory number of the called terminal 120, defined directly or indirectly by the user of the calling terminal 110;

the calling terminal's connection type featuring in the tables of its call server executing the CP task 111; this item can be used in particular to draw a distinction between the terminals connected to the "conventional" access points and those connected to the IP access points;

the reference topological node of the access point of the calling terminal, known to its call server as indicated previously;

for a conventional calling terminal, a corresponding physical equipment number denoting the interface of the PABX to which the terminal is connected;

for an IP calling terminal, an indication of the codings and bit rates with which it is compatible (for example G.711 only or G.711+G.723.1);

for an IP calling terminal, the IP address of the terminal in the network 2, 3, a UDP port number which it dedicates to the transmission of voice based on the RTP protocol and another UDP port number for the transmission of control information based on the RTCP protocol.

The call servers to which this message is broadcast analyze the number of the called terminal. The only call server that takes the message into account by creating a terminating-end-leg processing task 121 (CP), is that of the called terminal. This task 121 queries a topology server 90 to determine a configuration for the call.

The topology server 90 is queried on the basis of two sets of parameters, one relating to the calling terminal 110 and the other relating to the called terminal 120. Each set of parameters relating to a terminal includes:

the terminal's connection type, that is to say the family (conventional or IP) of its access point;

the identity of the reference topological node of the terminal's access point.

For the calling terminal, these parameters are obtained by the CP task 121 in the setup message received. For the called terminal, they are read by the task 121 in the data specific to that terminal and stored in the call server by means of the directory number obtained in the setup message received.

The topology server 90 returns to the call server an indication of a setup mode selected to define the communication path. Two modes are possible: one ("IP mode") in which the IP network mechanisms govern the establishment of the path, the other ("PABX mode") in which the PABX network mechanisms govern this establishment.

In the first case, the CP tasks cooperate to obtain the IP addresses to be placed in communication with each other. One or the other of these addresses may already be available if it is that of the IP-type calling or called terminal. If a gateway needs to be used at the calling end or at the called end, the corresponding call server reserves resources of this gateway (UDP port numbers) and then supplies to its peer the IP address and the reserved resources of this gateway. The CP tasks then supply the IP addresses and UDP ports relevant to the terminals or gateways that they are supervising in order that the communication can proceed according to the usual IP mechanisms.

In the second case, the CP tasks cooperate to obtain the physical addresses of topological nodes to be placed in communication with each other. In the case of an IP terminal, this node is not necessarily the reference topological node of the access point: it corresponds to a gateway identified by the call server on the basis of the reference node of the other terminal (for example, if the conventional terminal 61 calls the IP terminal 69, the CP task executed by the server 53 for the called end will supply the physical address of a gateway 54 or 55 which can be used to reach the CCU 33 of the calling terminal 61 and not that of the MGW 81 forming the reference node of the terminal 69). The applications that supervise and set up the communication paths in the PABX network 1 then take on the task of reserving and then activating the resources required for the communication being set up. Once the communication is set up, they continue to supervise the communication path in order to indicate the events relevant to the call servers.

Once the CP task of the called end has the necessary information, it sends to the called terminal 120, if that terminal is available, the page indicating the incoming call, and it returns to the CP task 111 of the calling end an alert message to indicate the start of ringing at the called terminal. This alert message is retransmitted in the form of a page to the calling terminal 110. When the called terminal seizes the line, the event is signaled to the CP task 121 which informs the CP task 111 of it in a connection message retransmitted in the form of a page to the calling terminal 110. The communication can then proceed conventionally. When one of the terminals hangs up, the other is informed of that event via the CP tasks 111, 112 before those tasks withdraw.

The topology server can also be queried by the call server of the calling end if a transfer request message (TRANSFER) is received.

Figure 3:
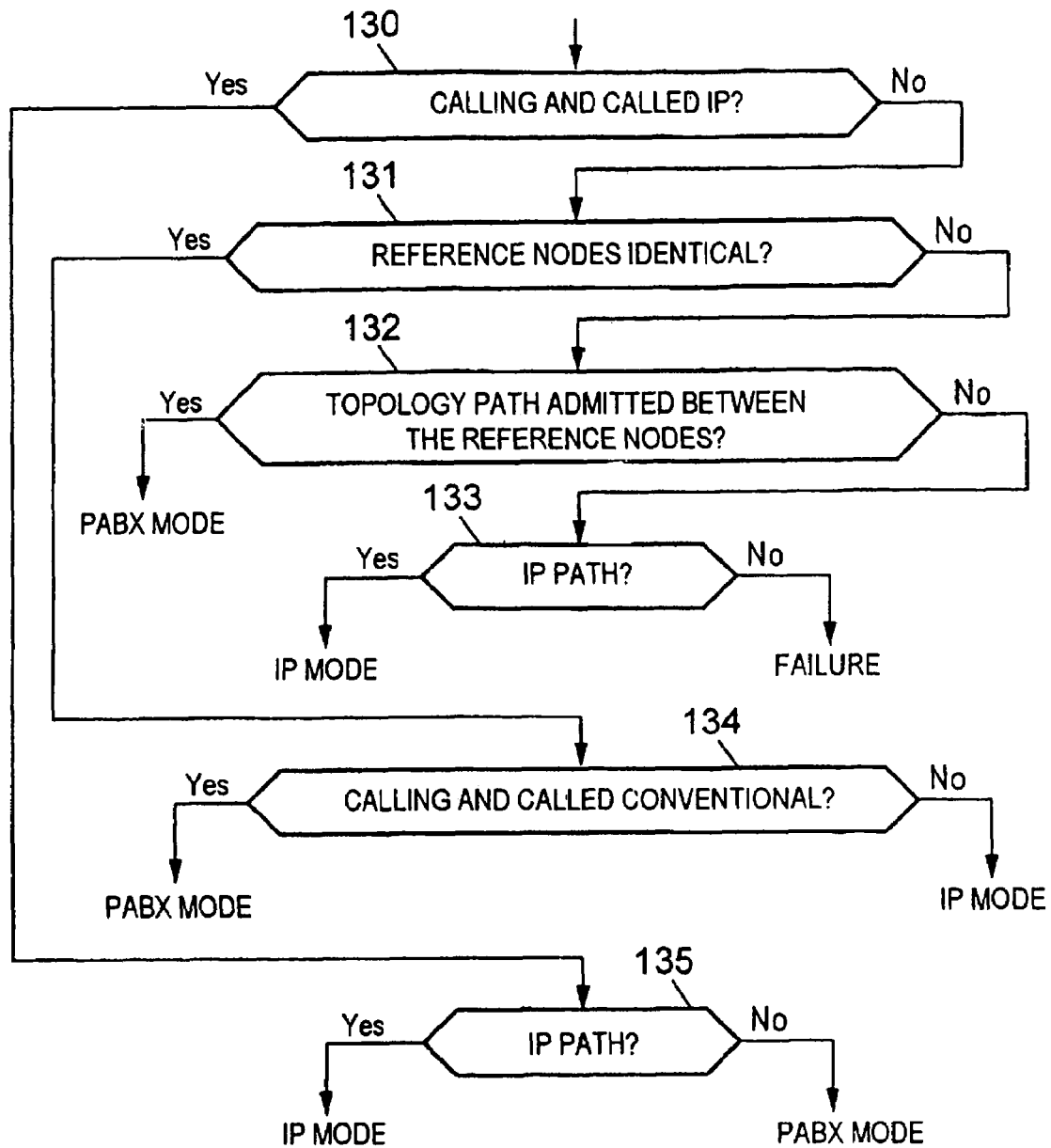
FIGS. 3 and 4 are flowcharts of procedures that can be executed by a topology server in accordance with the invention.

FIG. 3 shows a procedure which can be applied by the topology server to respond to the call server which queries it producing the two sets of parameters mentioned above.

A first step 130 of this procedure consists of a test to check whether the connection of each of the calling and called terminals is an IP connection. If it is, the topology server queries the IP path table if necessary, in a step 135, on the basis of the IP addresses of the terminals or, where necessary, of their community numbers, and hence it can be ensured that an IP communication path can be constructed between the two terminals. If the entry pair does not feature in the IP path table (test 135 for the existence of an IP path fails), the topology server 90 selects the PABX mode and as a result responds to the call server. If the test 135 is positive (or if the IP network is "tied", it selects the IP mode instead.

If at least one of the access points of the terminals is of the conventional type (according to test 130), the server 90 determines whether the reference topological nodes of the two access points are identical (test 131). If they are identical, the selected setup mode depends on knowing, at test 134, whether the access points of the calling and called terminals are both of the conventional type. If they are, the topology server selects the PABX mode. Otherwise, it selects the IP mode.

If the reference topological nodes of the access points of the calling and called terminals are different according to test 131, the server 90 examines at step 132 whether the topological path between the two topological nodes in question is admitted in the topology defined during configuration of the system. If it is, the PABX mode is selected. Otherwise, the server 90 queries the IP path table, if necessary, at step 133 on the basis of the IP addresses of the terminals or of their community numbers. If the entry pair does not feature in the IP path table (test 133 fails), the topology server 90 signals to the call server that establishment of the communication path requested is impossible. Such an error message is useful to the system administrator who will consider its occurrences as indications of a configuration error. If test 133 is positive (or if the IP network is "tied"), it selects the IP mode.

In one embodiment, the invention provides for the possibility for each access point of the system to present before the call setup request from the calling end, in addition to its native type, a complementary type (IP for a conventional access point and conventional for an IP access point).

The corresponding call server then writes the parameters relating to this appearance into a resource table. This table is written to as soon as a managed terminal participates in a call whose configuration requires the reservation of communication path resources temporarily giving it a complementary appearance, and updated when the last call context for this terminal is deleted. Such a terminal thus exhibits a double appearance, one native and the other virtual.

The resource table is consulted by the call processing task of the calling end before the call setup message is sent. This message can contain, where necessary, the parameters relating to the double appearance of the calling terminal. Likewise, on receiving the call setup message, the call server of the called terminal can consult its resource table with a view to communicating to the topology server the parameters relating to a possible double appearance of the called terminal. In this way, the message for querying the topology server can contain, in addition to the items that have been described previously, the parameters relating to the double appearance of the access point of the calling terminal and/or to that of the access point of the called terminal, where necessary.

Figure 4:
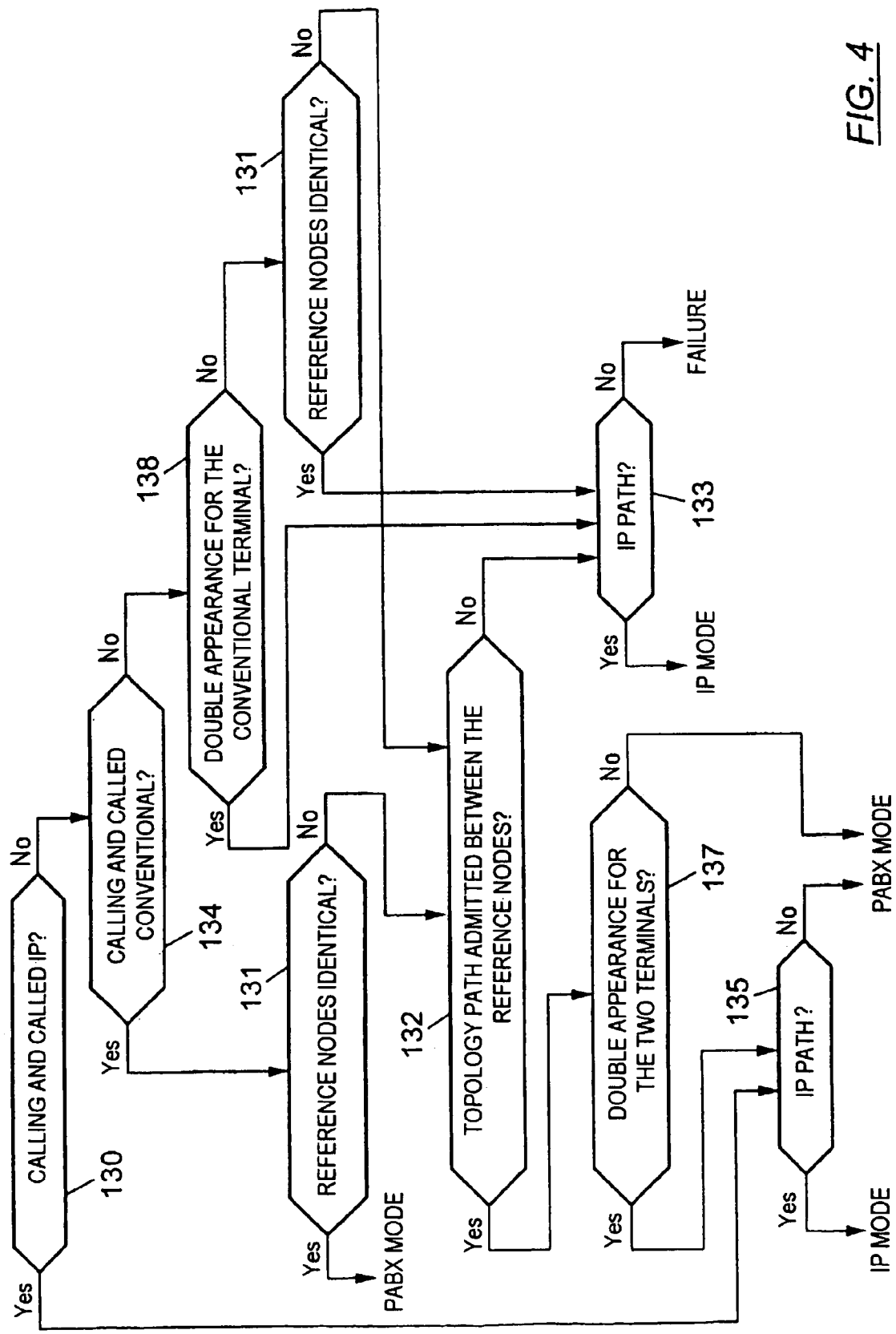

The response of the topology server is then determined according to the procedure illustrated by FIG. 4.

The first step 130 of this procedure consists of a test to check whether the connection of the calling party and called party terminals is of the IP type. If the access points are both IP access points, the request is processed in the same way as in the previous case (test 135).

If the terminals are not both IP terminals, test 134 relating to their connection type is performed to determine whether their access points are both conventional access points. If this is the case, the reference topological nodes of the two terminals are compared in test 131. If these reference topological nodes are identical, the server 90 selects the PABX mode. If they are distinct test 132 is performed to determine whether they form the end nodes of a topological path admitted by the configuration.

If this test 132 is positive, an additional test 137 is performed to determine whether the access points of the calling and called terminals both have a complementary appearance (in this particular case, an IP appearance). If this is the case, the topology server proceeds to the abovementioned step 135 to determine whether or not there is an IP path that the communication can use. If there is, it selects the IP mode. Otherwise, it selects the PABX mode, as if test 137 is negative.

If test 132 is negative, the topology server 90 proceeds to step 133 to determine whether or not there is an IP path that the communication can use. If this test 133 is negative, the topology server transmits a failure response. If it is positive, it selects the IP mode.

If the two terminals have different types of access points (test 134), one of the two is of the conventional native type, and the topology server 90 checks at test 138 whether it exhibits a complementary appearance (in this case IP). If this is the case, the topology server proceeds to the abovementioned step 133. Otherwise, it checks whether the reference topological nodes of the access points of the terminals are identical (test 131). If they are identical, it also proceeds to step 133. Otherwise, the topology server switches to the abovementioned step 132.

The invention claimed is:

1. A method for establishing communication paths between access points of a communication system, the communication system including at least one packet transmission network providing a first family of access points, switching means equipped with connection interfaces providing a second family of access points and at least one gateway interface with the packet transmission network, call processing means including at least one call server to store configuration data and context data relating to terminals connected to the system via the access points and to perform processing of signaling relating to said terminals, and at least one call configuration manager cooperating with the call processing means to select a communication path establishment mode from a first mode governed by mechanisms of the packet transmission network and a second mode governed by mechanisms of the switching means, wherein the mechanisms of the switching means governing the second mode exploit predefined data describing a topology of the communication system made up of topological nodes belonging to the switching means and admitted topological paths within the switching means between pairs of topological nodes, wherein a respective reference topological node belonging to the switching means is associated with each access point, such that the reference topological node of each access point of the second family is accessible from said access point without passing via the packet transmission network, wherein establishment of a communication path between access points to place in communication the first and second terminals respectively connected to said access points includes the steps of:

creating a first call processing task in a call server associated with the first terminal;

forming, at the first call processing task, an establishment message including at least a number of the first terminal, an indication of the family of the access point to which the first terminal is connected and the reference topological node of said access point;

in response to reception of said establishment message, creating a second call processing task in a call server associated with the second terminal; and querying the configuration server from the second call processing task, on the basis of the families and the reference topological nodes of the access points to which the first and second terminals are respectively connected, to obtain call configuration data indicating the establishment mode selected for the communication path between said access points wherein, in response to the querying from the second call processing task, the configuration manager selects the first communication path establishment mode when the access points to which the first and second terminals are respectively connected are from different families and have identical reference topological nodes.

2. The method as claimed in claim 1, wherein, in response to the querying from the second call processing task, the configuration manager selects the second communication path establishment mode when the access points to which the first and second terminals are respectively connected are both from the second family and have identical reference topological nodes.

3. The method as claimed in claim 1, wherein, in response to the querying from the second call processing task, the configuration manager examines, when at least one of the access points to which the first and second terminals are respectively connected is from the second family while the reference topological nodes of said access points are different, whether an admitted topological path is defined between said reference topological nodes in the topology of the communication system.

4. The method as claimed in claim 3, wherein the configuration manager selects the first communication path establishment mode in response to determination that no admitted topological path is defined between said reference topological nodes in the topology of the communication system.

5. The method as claimed in claim 3, wherein the configuration manager selects the second communication path establishment mode in response to determination that an admitted topological path is defined between said reference topological nodes in the topology of the communication system.

6. A method for establishing communication paths between access points of a communication system, the communication system including at least one packet transmission network providing a first family of access points, switching means equipped with connection interfaces providing a second family of access points and at least one gateway interface with the packet transmission network, call processing means including at least one call server to store configuration data and context data relating to terminals connected to the system via the access points and to perform processing of signaling relating to said terminals, and at least one call configuration manager cooperating with the call processing means to select a communication path establishment mode from a first mode governed by mechanisms of the packet transmission network and a second mode governed by mechanisms of the switching means, wherein the mechanisms of the switching means governing the second mode exploit predefined data describing a topology of the communication system made up of topological nodes belonging to the switching means and admitted topological paths within the switching means between pairs of topological nodes, wherein a respective reference topological node belonging to the switching means is associated with each access point, such that the reference topological node of each access point of the second family is accessible from said access point without passing via the packet transmission network, wherein establishment of a communication path between access points to place in communication the first and second terminals respectively connected to said access points includes the steps of:

creating a first call processing task in a call server associated with the first terminal;

forming, at the first call processing task, an establishment message including at least a number of the first terminal, an indication of the family of the access point to which the first terminal is connected and the reference topological node of said access point;

in response to reception of said establishment message, creating a second call processing task in a call server associated with the second terminal; and querying the configuration server from the second call processing task, on the basis of the families and the reference topological nodes of the access points to which the first and second terminals are respectively connected, to obtain call configuration data indicating the establishment mode selected for the communication path between said access points wherein the packet transmission network includes at least two separate sub-networks connected to the switching means by respective gateway interfaces, and further comprising the step of signaling, from the configuration manager an impossibility to establish the communication path when it determines in response to determination that no admitted topological path is defined between said reference topological nodes in the topology of the communication system while the access point, to which one of the first and second terminals is connected, is connected to a gateway interface with one of the sub-networks and while the access point to which the other terminal is connected belongs to another of the sub-networks or is connected to a gateway interface with another of the sub-networks via the switching means.

7. A communication system including a packet transmission network providing a first family of access points, switching means equipped with connection interfaces providing a second family of access points and with at least one gateway interface with the packet transmission network, call processing means including at least one call server to store configuration data and context data relating to terminals connected to the system via the access points and to perform processing of signaling relating to said terminals, and at least one call configuration manager cooperating with the call processing means to select a communication path establishment mode from a first mode governed by mechanisms of the packet transmission network and a second mode governed by mechanisms of the switching means wherein the mechanisms of the switching means governing the second mode exploit predefined data describing a topology of the communication system made up of topological nodes belonging to the switching means and admitted topological paths within the switching means between pairs of topological nodes, wherein a respective reference topological node belonging to the switching means is associated with each access point, such that the reference topological node of each access point of the second family is accessible from said access point without passing via the packet transmission network, wherein a call server associated with the first terminal comprises means for creating a first call processing task therein in the establishment of a communication path between access points to place in communication the first and second terminals respectively connected to said access points, the first call processing task being arranged to form an establishment message including at least a number of the first terminal, an indication of the family of the access point to which the first terminal is connected and the reference topological node of said access point, and wherein a call server associated with the second terminal comprises means for creating a second call processing task therein in response to reception of said establishment message, the second call processing task being arranged to query the configuration server on the basis of the families and the reference topological nodes of the access points to which the first and second terminals are respectively connected, to obtain call configuration data indicating the establishment mode selected for the communication path between said access points, wherein the configuration manager is arranged to select the first communication path establishment mode, in response to querying from the second call processing task, when the access points to which the first and second terminals are respectively connected are from different families and have identical reference topological nodes.

8. The communication system as claimed in claim 7, wherein the configuration manager is arranged to select the second communication path establishment mode, in response to querying from the second call processing task, when the access points to which the first and second terminals are respectively connected are both from the second family and have identical reference topological nodes.

9. The communication system as claimed in claim 7, wherein the configuration manager is arranged to examine whether an admitted topological path is defined between said reference topological nodes in the topology of the communication system, in response to querying from the second call processing task, when at least one of the access points to which the first and second terminals are respectively connected is from the second family while the reference topological nodes of said access points are different.

10. The communication system as claimed in claim 9, wherein the configuration manager is arranged to select the first communication path establishment mode in response to determination that no admitted topological path is defined between said reference topological nodes in the topology of the communication system.

11. The communication system as claimed in claim 9, wherein the configuration manager is arranged to select the second communication path establishment mode in response to determination that an admitted topological path is defined between said reference topological nodes in the topology of the communication system.

12. The communication system as claimed in claim 7, wherein the packet transmission network includes at least two separate sub-networks connected to the switching means by respective gateway interfaces, and wherein the configuration manager is arranged to signal an impossibility to establish the communication path in response to determination that no admitted topological path is defined between said reference topological nodes in the topology of the communication system while the access point, to which one of the first and second terminals is connected, is connected to a gateway interface with one of the sub-networks and while the access point to which the other terminal is connected belongs to another of the sub-networks or is connected to a gateway interface with another of the sub-networks via the switching means.

\* \* \* \* \*